United States Patent
Kim et al.

(10) Patent No.: US 9,688,572 B2
(45) Date of Patent: Jun. 27, 2017

(54) LOW-EMISSIVITY COATING AND FUNCTIONAL CONSTRUCTION MATERIAL FOR WINDOW AND DOOR INCLUDING SAME

(71) Applicant: LG Hausys, Ltd., Seoul (KR)

(72) Inventors: Ung-Kil Kim, Gunpo-si (KR); Youn-Ki Jun, Gwacheon-si (KR); Dae-Hoon Kwon, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/915,254

(22) PCT Filed: Sep. 1, 2014

(86) PCT No.: PCT/KR2014/008137
§ 371 (c)(1),
(2) Date: Feb. 29, 2016

(87) PCT Pub. No.: WO2015/030549
PCT Pub. Date: Mar. 5, 2015

(65) Prior Publication Data
US 2016/0207826 A1    Jul. 21, 2016

(30) Foreign Application Priority Data
Sep. 2, 2013 (KR) .......... 10-2013-0104832

(51) Int. Cl.
*B32B 17/06* (2006.01)
*B32B 15/04* (2006.01)
(Continued)

(52) U.S. Cl.
CPC ........ *C03C 17/366* (2013.01); *C03C 17/3618* (2013.01); *C03C 17/3626* (2013.01); *C03C 17/3636* (2013.01); *C03C 17/3639* (2013.01); *C03C 17/3642* (2013.01); *C03C 17/3644* (2013.01); *C03C 17/3649* (2013.01);
(Continued)

(58) Field of Classification Search
USPC ....... 428/426, 428, 432, 433, 434, 688, 687, 428/689, 697, 699, 701, 702
See application file for complete search history.

(56) References Cited

U.S. PATENT DOCUMENTS 6,180,247 B1    1/2001  Szczyrbowski et al.
2004/0241406 A1*  12/2004  Nadaud ............ B32B 17/10036
                                                      428/212
(Continued)

FOREIGN PATENT DOCUMENTS

KR    20080082447 A    9/2008
KR    20130020029 A    2/2013
(Continued)

OTHER PUBLICATIONS

Lentax-yug (http://lentax-yug.com/eng/index.php?id=47).*
International Search Report mailed Dec. 9, 2014 corresponding to International Application No. PCT/KR2014/008137.

*Primary Examiner* — Lauren R Colgan
(74) *Attorney, Agent, or Firm* — Hauptman Ham, LLP

(57) ABSTRACT

Disclosed is a multi-layered low-emissivity coating sequentially comprising: a Ti-based oxide layer, a composite metallic oxide layer of zinc and aluminum, a low-emissivity protective metal layer, and a low-emissivity layer.

20 Claims, 2 Drawing Sheets

(51) Int. Cl.
*C03C 17/36* (2006.01)
*C09D 1/00* (2006.01)

(52) U.S. Cl.
CPC ............ *C03C 17/3681* (2013.01); *C09D 1/00* (2013.01); *C03C 2217/212* (2013.01); *C03C 2217/26* (2013.01); *C03C 2217/281* (2013.01)

(56) References Cited

U.S. PATENT DOCUMENTS

| | | | | |
|---|---|---|---|---|
| 2006/0046018 A1* | 3/2006 | Lemmer | ................. | C03C 17/36 428/68 |
| 2009/0130409 A1* | 5/2009 | Reutler | ............ | B32B 17/10018 428/216 |
| 2009/0176086 A1* | 7/2009 | Martin | .............. | B32B 17/10174 428/332 |
| 2009/0197077 A1* | 8/2009 | Reutler | ................... | C03C 17/36 428/336 |
| 2009/0263596 A1* | 10/2009 | Lao | ......................... | C03C 17/36 428/34 |
| 2010/0136365 A1* | 6/2010 | Unquera | ................. | C03C 17/36 428/623 |
| 2011/0268941 A1* | 11/2011 | Fischer | ............ | B32B 17/10036 428/213 |
| 2011/0300319 A1* | 12/2011 | Reymond | ............... | C03C 17/36 428/34 |
| 2011/0305853 A1* | 12/2011 | Reymond | ............... | C03C 17/36 428/34 |
| 2012/0028009 A1* | 2/2012 | Gerardin | ................. | C03C 17/36 428/212 |
| 2012/0087005 A1* | 4/2012 | Reymond | ............... | C03C 17/36 359/360 |
| 2012/0177900 A1* | 7/2012 | Laurent | ............ | B32B 17/10036 428/213 |

FOREIGN PATENT DOCUMENTS

| | | |
|---|---|---|
| KR | 20130051521 A | 5/2013 |
| WO | 2011010824 A2 | 1/2011 |

\* cited by examiner

LOW-EMISSIVITY COATING AND FUNCTIONAL CONSTRUCTION MATERIAL FOR WINDOW AND DOOR INCLUDING SAME

CROSS REFERENCE TO RELATED APPLICATION

This application claims the priority of Korean Patent Application No. 10-2013-0104832, filed on Sep. 2, 2013 in the KIPO (Korean Intellectual Property Office). Further, this application is the National Phase application of International Application No. PCT/KR2014/008137 filed Sep. 1, 2014, which designates the United States and was published in Korean.

TECHNICAL FIELD

The present disclosure relates to a low-emissivity coating and a functional construction material for window and door including the same.

BACKGROUND ART

Low-emissivity glass refers to a glass on which a low-emissivity layer including a metal such as silver (Ag) having high reflectance in an infrared region is deposited as a thin film. This low-emissivity glass is a functional material providing energy saving effects by reflecting solar radiation in summer while preserving infrared radiation generated from an indoor heater in winter.

Typically, silver (Ag) that may be used as the low-emissivity layer is oxidized when exposed to air. Therefore, dielectric layers are deposited on upper and lower surfaces of the low-emissivity layer. The dielectric layers also serve to increase a visible light transmittance.

DISCLOSURE

Technical Problem

One aspect of the present disclosure is to provide a low-emissivity coating with excellent optical property while maintaining durability after heat treatment.

Another aspect of the present disclosure is to provide a functional construction material for window and door comprising the low-emissivity coating.

Technical Solution

In one embodiment of the present disclosure, provided is a multilayered low-emissivity coating that may sequentially include a Ti-based oxide layer, a composite metallic oxide layer of zinc and aluminum, a low-emissivity protective metal layer, and a low-emissivity layer.

The composite metallic oxide layer of zinc and aluminum may include a composite metallic oxide of zinc and aluminum represented by $ZnAlO_x$, where $0.9 \leq x \leq 1.1$.

The composite metallic oxide layer of zinc and aluminum may have a thickness of about 2 nm to about 10 nm.

The low-emissivity layer may have an emissivity of about 0.01 to about 0.3.

The low-emissivity layer may include at least one selected from the group consisting of Ag, Au, Cu, Al, Pt, ion-doped metal oxide, and combinations thereof.

The low-emissivity layer may have a thickness of about 5 nm to about 25 nm.

The low-emissivity protective metal layer may have an extinction coefficient in a visible light region of about 1.5 to about 4.

The low-emissivity protective metal layer may include at least one selected from the group consisting of Ni, Cr, alloy of Ni and Cr, Ti, and combinations thereof.

The low-emissivity coating may further include an outermost dielectric layer having a Si-based composite metal nitride on either or both surfaces thereof.

The Si-based composite metal nitride may include at least one selected from the group consisting of Al, Ti, Co, and combinations thereof.

The multilayered low-emissivity coating may include, from the bottom, in laminated structure, a first outermost dielectric layer, a Ti-based oxide layer, a composite metallic oxide layer of zinc and aluminum, a first low-emissivity protective metal layer, a low-emissivity layer, a second low-emissivity protective metal layer, and a second outermost dielectric layer, wherein the first outermost dielectric layer and the second outermost dielectric layer may include a Si-based composite metal nitride.

In another embodiment of the present disclosure, provided is a functional construction material for window and door, including a transparent substrate; and the multilayered low-emissivity coating applied on the transparent substrate.

The multilayered low-emissivity coating may be laminated in such a way that the Ti-based oxide layer is arranged closer to the transparent substrate than the low-emissivity layer.

The transparent substrate may have a visible light transmittance in a range of about 90% to about 100%.

The substrate may be a glass or transparent plastic substrate.

Advantageous Effects

The multilayered low-emissivity coating has an excellent optical property while exhibiting excellent durability after heat treatment.

DESCRIPTION OF DRAWINGS

The above and other objects and features of the present disclosure will become apparent from the following descriptions, when taken in conjunction with the accompanying drawings, in which.

BEST MODE

Figure 1:
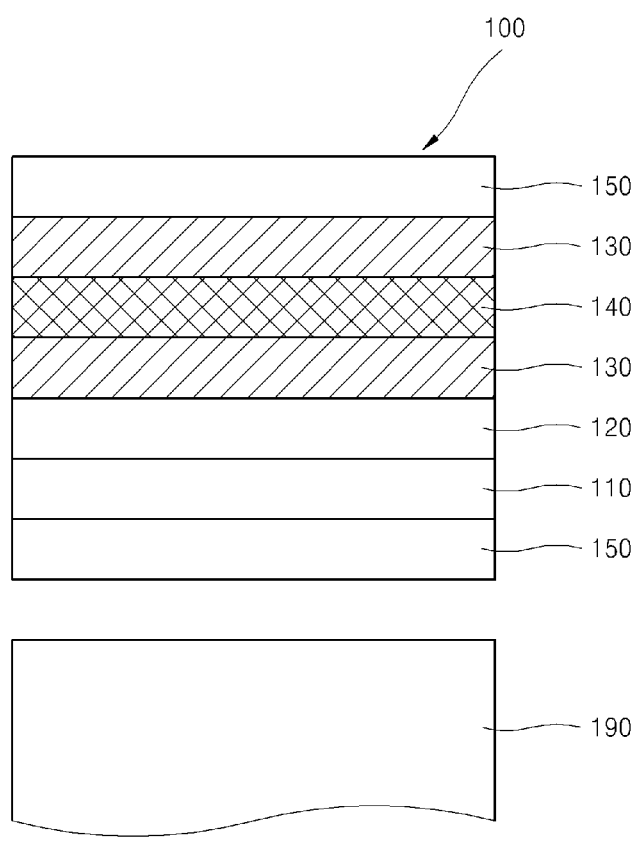
FIG. 1 is a schematic cross-sectional view of a low-emissivity coating in accordance with one embodiment of the present disclosure.

Hereinafter, exemplary embodiments will be described in detail with reference to the accompanying drawings so as to be easily practiced by a person of ordinary skill in the art. It should be understood that the present disclosure is not to be construed as limited to the exemplary embodiments set forth herein and may be embodied in many different forms.

Any redundant descriptions of well-known parts will be omitted for clarity, and like reference numerals refer to like elements throughout the specification.

In the drawings, thicknesses are enlarged for clarity of various layers and regions. In addition, thicknesses of some layers and regions are exaggerated for convenience of description.

It will be understood that when an element such as a layer, region or substrate is referred to as being "on" or extending "onto" another element, it can be directly on or extend directly onto the other element or intervening elements may also be present.

Referring now to FIG. 1, a low-emissivity coating in accordance with one embodiment of the present disclosure is depicted.

FIG. 1 is a cross-sectional view of a low-emissivity coating 100 according to one embodiment of the disclosure. The coating 100 is a multilayered structure sequentially including a Ti-based oxide layer 110, a composite metallic oxide layer of zinc and aluminum 120, a low-emissivity protective metal layer 130, and a low-emissivity layer 140.

The low-emissivity coating 100 may be used to prepare a so called Low-E (low-emissivity) glass. The Low-E glass is a functional construction material for window and door with a low-emissivity, and is typically implemented by forming a coating layer on a transparent glass substrate. The low-emissivity coating 100 may be used as a coating layer.

The low-emissivity coating 100 may improve the durability of the functional construction material for window and door to be applied by providing a specific structure according to each of the layers including a specific material as described above and their stacking sequence.

The low-emissivity coating 100 has a multilayered thin film structure based on a low-emissivity layer 140 that selectively reflects far infrared radiations of sunlight, and imparts a Low-E effect to the functional construction material for window and door with the low-emissivity coating 100 applied thereto, by lowering the emissivity by the low-emissivity coating 100, as well as capable of providing a thermal insulation performance provided by the Low-E effect.

The functional construction material for window and door including the low-emissivity coating 100 as a coating layer on the transparent substrate is a functional material realizing energy saving effects for buildings by reflecting solar radiation in summer while preserving infrared radiations generated from an indoor heater in winter.

As used herein, the term "emissivity" refers to a ratio by which an object absorbs, transmits and reflects energy having any specific wavelength. That is, as used herein, the term "emissivity" indicates a degree of absorption of infrared energy in an infrared wavelength region, and specifically refers to a ratio of absorbed infrared energy to applied infrared energy when far infrared radiations, which correspond to a wavelength region from about 5 µm to about 50 µm and exhibit strong thermal action, are applied.

According to Kirchhoff's law, an infrared energy absorbed by a material is radiated back from the material, and therefore absorptivity and emissivity must be equal.

In addition, non-absorbed infrared energy is reflected from a surface of the material, and therefore the emissivity becomes lower with increasing infrared energy reflected. This relationship is represented by the equation: Emissivity=1−reflectance of IR.

The emissivity may be measured by a variety of methods commonly known in the art, and the emissivity may be for example measured with equipment such as Fourier transform infrared spectroscopy (FT-IR) in accordance with the standard method KSL2514.

The absorptivity for far infrared radiations exhibiting a strong thermal action, i.e., emissivity, may represent a very important significance in the measurement of a degree of thermal insulation performance.

As described above, since the low-emissivity coating 100 includes the coating layer formed on the transparent substrate such as a glass substrate and the like, the low-emissivity coating 100 can exhibit a reduced emissivity while maintaining a desired transmittance characteristic in the visible light region, and thus can be used as an energy-saving functional construction material providing excellent thermal insulation.

Each of the layers included in the low-emissivity coating 100 will now be described in detail.

The low-emissivity layer 140 is formed by an electrically conductive material that can have a low-emissivity, for example, a layer formed of a metal, and therefore has a low sheet resistance, and has a low-emissivity accordingly. For example, the low-emissivity layer 140 may have an emissivity of from about 0.01 to about 0.3, in particular from about 0.01 to about 0.2, more particularly from about 0.01 to about 0.1, and even more particularly from about 0.01 to about 0.08. If the low-emissivity layer 140 has an emissivity within the above range, both the thermal insulation and the visible light transmittance of the low-emissivity coating 100 may be considered to be appropriate. The low-emissivity layer 140 formed as a thin film having an emissivity as above may have a sheet resistance of about 0.78 Ω/sq to about 6.42 Ω/sq.

The low-emissivity layer 140 performs a function of selectively transmitting and reflecting the solar radiation. The low-emissivity layer 140 may include, but is not limited to, at least one selected from the group consisting of Ag, Au, Cu, Al, Pt, ion-doped metal oxide, and combinations thereof. The ion-doped metal oxide may include for example indium tin oxide (no), fluorine-doped tin oxide (FTO), Al-doped zinc oxide (AZO), and gallium zinc oxide (GZO). In certain embodiments, the low-emissivity layer 140 may be silver (Ag), whereby the low-emissivity coating 100 can implement a high electrical conductivity, a low absorptivity in the visible light region, an excellent durability, and the like.

The low-emissivity layer 140 may have a thickness of for example about 10 nm to about 25 nm. The low-emissivity layer 140 having a thickness within the above range is suitable for implementing both the low-emissivity and the high visible light transmittance at the same time.

The low-emissivity protective metal layer 130 is composed of a metal exhibiting excellent light absorption performance and plays a role in adjusting sunlight. A color realized by the low-emissivity coating 100 may be controlled by adjusting a material, thickness and the like of the low-emissivity protective metal layer 130.

The low-emissivity protective metal layer 130 may be stacked on either side or both sides of the low-emissivity layer 140.

In certain embodiments, the low-emissivity protective metal layer 130 may have an extinction coefficient of about 1.5 to about 3.5 in the visible light region. The extinction coefficient is a value derived from an optical constant which is an inherent property of a material. The optical constant is represented by the equation: n−ik, wherein the real part n is a refractive index, and the imaginary number k is an extinction coefficient (also referred to as an absorption coefficient). The extinction coefficient is a function of wavelength ($\lambda$), and a metal generally has an extinction coefficient of greater than zero (0). The extinction coefficient k is in a relationship with the absorption coefficient α as α=(4πk)/λ. Further, when the absorption coefficient α is in a relationship with the thickness d through which the light passes as I=IO exp(−αd), the intensity of light passing through the thickness d (I) is reduced compared to the intensity of incident light (IO) due to light absorption by a medium.

Since the low-emissivity protective metal layer 130 uses a metal having an extinction coefficient within the above range in the visible light region, the low-emissivity protective metal layer 130 absorbs a certain portion of the visible light and allows the low-emissivity coating 100 to have a predetermined color.

For example, the low-emissivity protective metal layer 130 may include, but is not limited to, at least one selected from the group consisting of Ni, Cr, alloys of Ni and Cr, Ti, and combinations thereof.

The low-emissivity protective meal layer 130 may have a thickness of for example about 1 nm to about 5 nm. Since the low-emissivity coating 100 includes the low-emissivity protective metal layer 130 having a thickness within this range, the low-emissivity coating 100 can be adjusted to have predetermined transmittance and reflectance, and serve as a low-emissivity protective layer.

The Ti-based oxide layer 110 and the composite metallic oxide layer of zinc and aluminum 120 act as a protective layer for protecting the low-emissivity protective metal layer 130 and the low-emissivity layer 140 as dielectric layers, and allows desired target values of optical properties such as transmittance and reflectance, and transmittance and reflectance colors depending on the refractive index by adjusting a material, a thickness, and the like.

Specifically, the Ti-based oxide layer 110 may be a layer formed by depositing a titanium oxide, represented by TiOx (where 1.8≤x≤2.2). The Ti-based oxide layer 110 is easy to give various optical performances (transmittance, reflectance, or color index) to the low-emissivity coating 100. That is, the optical performance range that can not be implemented with the low-emissivity coating 100 other than the Ti-based oxide layer 110 may be implemented by applying the Ti-based oxide layer 110.

However, when including the Ti-based oxide layer, the formation of the low-emissivity protective metal layer thereon may cause a problem to decrease the durability such as an abrasion resistant after a heat treatment by an interface reaction between the Ti-based oxide layer and the low-emissivity protective metal layer.

By way of interposing the composite metallic oxide layer of zinc and aluminum 120 between the low-emissivity protective metal layer 130 and the Ti-based oxide layer 110, it may serve to prevent the durability deterioration caused by an interface reaction due to the direct contact of the low-emissivity protective metal layer 130 and the Ti-based oxide layer 110 after a heat treatment. That is, the composite metallic oxide layer of zinc and aluminum 120 may improve the adhesion of the low-emissivity protective metal layer 130 and the Ti-based oxide layer 110, and prevent the durability deterioration of the low-emissivity coating after a heat treatment.

Accordingly, the low-emissivity coating 100 can solve the problem of the reduced durability by the composite metallic oxide layer of zinc and aluminum 120, while implementing a variety of optical performance owing to the Ti-based oxide layer 110.

The composite metallic oxide layer of zinc and aluminum may a layer including a composite metallic oxide of zinc and aluminum represented by $ZnAlO_x$ (where 0.9≤x≤1.1), and specifically, may be formed by depositing a composite metallic oxide of zinc and aluminum.

The composite metallic oxide layer of zinc and aluminum 120 may have a thickness of from about 2 nm to about 10 nm.

The low-emissivity coating 100 may further include an outermost dielectric layer 150 having a Si-based composite metal nitride on either or both surfaces thereof.

The Si-based composite metal nitride may be formed as a nitride of Si and include at least one metal selected from the group consisting of Al, Ti, Co, and combinations thereof. Specifically, the Si-based composite metal nitride may be a layer formed by depositing a compound represented by $SiAlN_x$ (where 1.2≤x≤1.5).

The low-emissivity coating 100 may further include an additional dielectric layer according to a performance and a desired application to be implemented in addition to the layers described above. The additional dielectric layer may include various metal oxides, metal nitrides, and the like. For example, the additional dielectric layer may include, but is not limited to, at least one selected from the group consisting of titanium oxide, zinc tin oxide, zinc oxide, zinc aluminum oxide, tin oxide, bismuth oxide, silicon nitride, silicon aluminum nitride, and combinations thereof. The metal oxides and/or metal nitrides may be doped with at least one element selected from the group consisting of bismuth (Bi), boron (B), aluminum (Al), silicon (Si), magnesium (Mg), antimony (Sb), beryllium (Be), and combinations thereof.

The low-emissivity coating 100 can be achieved by adjusting a material, a position and a thickness of the respective layers constituting the low-emissivity coating 100 and control the transmittance and reflectance depending on the wavelength band of light, thereby realizing an optical spectrum suitable for the purpose of use. That is, the low-emissivity coating 100 allows fine control of optical properties, such as color, reflectance, transmittance, and the like, of a highly reflective surface thereof, which is visible from the outside, by adjusting the material and thickness of the respective layers.

The low-emissivity coating 100 shown in FIG. 1 has a laminated structure, which includes, from the bottom, a first outermost dielectric layer 150, a Ti-based oxide layer 110, a composite metallic oxide layer of zinc and aluminum 120, a first low-emissivity protective metal layer 130, a low-emissivity layer 140, a second low-emissivity protective metal layer 130, and a second outermost dielectric layer 150.

The first outermost dielectric layer 150 and the second outermost dielectric layer 150 is a layer including a Si-based composite metal nitride.

The low-emissivity coating 100 may be formed by forming the low-emissivity coating 100 in a direction toward the composite metallic oxide layer of zinc and aluminum 120 from the low-emissivity layer 140, and then attached to a substrate 190.

For example, the substrate 190 may be a transparent substrate, and may form a coating layer with the low-emissivity coating 100 to prepare a functional construction material for window and door, such as Low-E glass.

In another embodiment of the present disclosure, provided is a functional construction material for window and door 200, which may include a transparent substrate 290; and the low-emissivity coating 280 applied on the transparent substrate 290.

Figure 2:
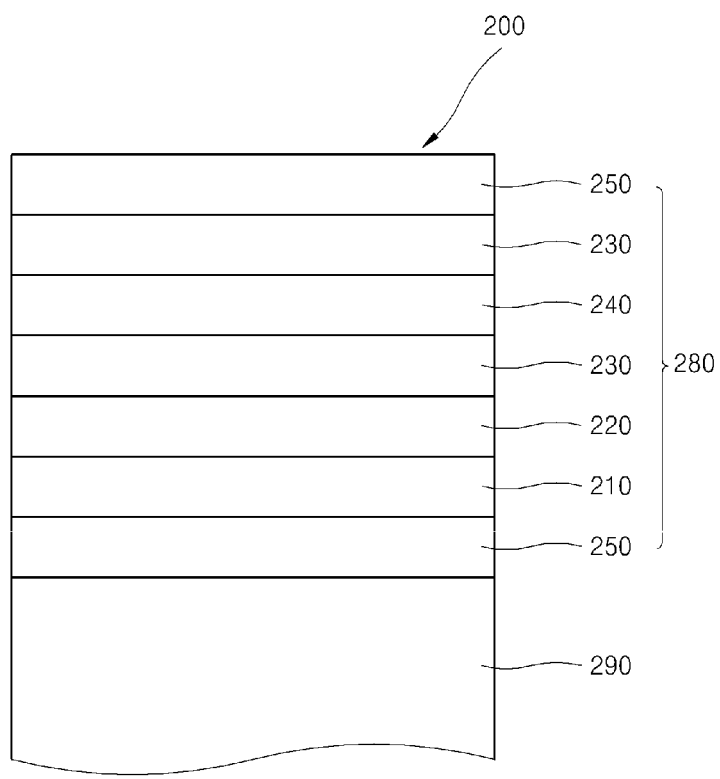
FIG. 2 is a schematic cross-sectional view of a functional construction material for window and door having a low-emissivity coating in accordance with another embodiment of the present disclosure.

FIG. 2 shows an exemplary cross-sectional view of the functional construction material for window and door.

The transparent substrate 290 may be a transparent substrate with a high visible light transmittance, and for example a glass or a transparent plastic substrate having a visible light transmittance of about 90% to about 100%. For example and without limitation, the transparent substrate 290 may be any glass that can be used for construction, and may have a thickness of about 2 mm to about 12 mm.

The functional construction material for window and door 200 may ensure the insulation performance due to the Low-E effects by applying the low-emissivity coating 280, while exhibiting excellent durability owing to the low-emissivity coating 280 as described above.

The low-emissivity coating 280 may be prepared by laminating each of the layers using any methods known in the art. For example, each of the layers may be laminated using any deposition methods known in the art without limitation.

For example, each of the layers in the low-emissivity coating 280 may be deposited by any methods known in the art. For example, the layers may be deposited using a magnetron sputter.

Next, the present disclosure will be described in more detail with reference to certain illustrative examples. It should be understood that these examples are provided for illustration only and are not to be in any way construed as limiting the present disclosure.

EXAMPLES

Example 1

Low-E glass coated with a low-emissivity coating having a multilayered structure of a composition and thickness as listed in Table 1 was manufactured using a magnetron (C-Mag) sputter (Cetus-S, Selcos Co., Ltd.).

First, 38 nm thick $SiAlN_x$ layer was deposited onto 6 mm thick transparent glass substrate under nitrogen/argon atmosphere (60 vol. % of nitrogen and 40 vol. % of argon). Then, 34 nm thick $TiO_x$ layer was deposited under oxygen/argon atmosphere (10 vol. % of oxygen and 90 vol. % of argon), and 6 nm thick $ZnAlO_x$ layer was deposited under 100 vol. % of argon atmosphere. 3.5 nm thick NiCr layer, 11 nm thick Ag layer, and 3.5 nm thick NiCr layer were sequentially deposited under 100 vol. % of argon atmosphere, followed by finally depositing 50 nm thick $SiAlN_x$ layer under the same deposition conditions as the above $SiAlN_x$ layer, thereby manufacturing the Low-E glass coated with the low-emissivity coating.

Example 2

The Low-E glass was manufactured in the same conditions as in Example 1, except that 3 nm thick of $ZnAlO_x$ layer was deposited.

Comparative Example 1

The Low-E glass was manufactured in the same conditions as in Example 1, without the $ZnAlO_x$ layer in the multilayered structure.

Comparative Example 2

The Low-E glass was manufactured in the same conditions as in Example 1, without the $TiO_x$ layer and $ZnAlO_x$ layer in the multilayered structure.

TABLE 1

| | Multilayered structure (film thickness, nm) |
|---|---|
| Ex. 1 | Transparent glass/$SiAlN_x$ (38)/$TiO_x$ (34)/$ZnAlO_x$ (6)/NiCr(3.5)/Ag(11)/NiCr(3.5)/$SiAlN_x$ (50) |
| Ex. 2 | Transparent glass/$SiAlN_x$ (38)/$TiO_x$ (34)/$ZnAlO_x$ (3)/NiCr(3.5)/Ag(11)/NiCr(3.5)/$SiAlN_x$ (50) |
| C. Ex. 1 | Transparent glass/$SiAlN_x$ (38)/$TiO_x$ (34)/NiCr(3.5)/Ag(11)/NiCr(3.5)/$SiAlN_x$ (50) |
| C. Ex. 2 | Transparent glass/$SiAlN_x$ (38)/NiCr(3.5)/Ag(11)/NiCr(3.5)/$SiAlN_x$ (50) |

Evaluation of Properties

Experimental Example 1

Low-E glass samples manufactured in Examples 1 to 5 and Comparative Examples 1 to 3 was subjected to heat treatment as follows, and optical properties were evaluated.

The samples were placed in a laboratory box furnace, while maintaining the temperature in the equipment at about 700° C. for 7 minutes, and then the samples were taken out therefrom. Before and after the heat treatment, visible light transmittance and haze value were measured for each of the samples using a Haze-Gardner plus apparatus. The results were shown in Table 2.

Experimental Example 2

Low-E glass samples manufactured in Examples 1 to 5 and Comparative Examples 1 to 3 were subjected to wear resistance tests conducted before and after heat treatment using a small washer. Each of the samples were placed thereinto, and hold for 57 seconds in the position of brush, and then made running 3 seconds. At this time, water supply was made abundantly. Washing grades were divided as grades 1 to 6, wherein the grade with no scratch generation was evaluated as grade 1, and listed in Table 3 below.

TABLE 2

| | Δ visible light transmittance (%) | | | Δ Haze | | |
|---|---|---|---|---|---|---|
| | Before heat treatment | After heat treatment | Difference (Δ) | Before heat treatment | After heat treatment | Difference (Δ) |
| Ex. 1 | 44.79. | 48.70. | 3.91. | 0.12. | 0.20. | 0.08. |
| Ex. 2 | 41.92. | 47.78. | 5.86. | 0.12. | 0.60. | 0.47. |
| C. Ex. 1 | 42.31. | 49.39. | 7.08. | 0.12. | 0.50. | 0.38. |
| C. Ex. 2 | 38.60. | 40.50. | 1.9. | 0.12. | 0.16. | 0.04. |

TABLE 3

| | Washing grade | | |
|---|---|---|---|
| | Before heat treatment | After heat treatment | Remarks |
| Ex. 1 | Grade 1 | Grade 1 | No damage to the low-emissivity coating after heat treatment |
| Ex. 2 | Grade 1 | Grade 1 | No damage to the low-emissivity coating after heat treatment |
| Comparative Ex. 1 | Grade 1 | Grade 6 | Peeling off in the low-emissivity coating after heat treatment |
| Comparative Ex. 2 | Grade 1 | Grade 1 | No damage to the low-emissivity coating after heat treatment |

Comparative Example 2 has less changes in the visible light transmittance and haze value before and after the heat treatment compared to Examples 1 and 2, and Comparative Example 1, but since only one material (SiAlN$_x$) was used in addition to the metal layer, the implementable optical performance is limited compared to the addition of TiO$_x$ layer (Examples 1 and 2, and Comparative Example 1).

Examples 1 and 2, and Comparative Example 1 had broadened optical performances by adding TiO$_x$ layer, compared to Comparative Example 2, but Comparative Example 1 had a lowered wear resistance due to an interfacial adhesion problem generated between the TiO$_x$ layer and NiCr layer, as can be seen from the results of Tables 2 and 3.

On the other hand, we have confirmed that Examples 1 and 2 are excellent in wear resistance even after the heat treatment, and the interface adhesion problem between the TiO$_x$ layer and the NiCr layer was overcome. As can be seen from Table 3, Examples 1 and 2 did not cause damage to the low-emissivity coating during the wash test after the thermal treatment.

In Table 2, Example 1 having more thicker ZnAlO$_x$ layer compared to Example 2 showed almost no haze after the heat treatment, and less changes in the visible light transmittance due to the interface reaction between the vapor deposition layers.

BRIEF DESCRIPTION OF SYMBOLS

100, 280: Low-emissivity coating
110, 210: Ti-based oxide layer
120, 220: Composite metallic oxide layer of zinc and aluminum
130, 230: Low-emissivity protective metal layer
140, 240: Low-emissivity layer
150, 250: Outermost dielectric layer
190, 290: Glass substrate
200: Functional construction material for window and door

The invention claimed is:

1. A multi-layered low-emissivity coating having a bottom surface and a top surface opposite to the bottom surface, the multi-layered low-emissivity coating sequentially comprising, from the bottom surface to the top surface:
a Ti-based oxide layer;
a composite metallic oxide layer of zinc and aluminum;
a low-emissivity protective metal layer; and
a low-emissivity layer,
wherein the composite metallic oxide layer of zinc and aluminum comprises a composite metallic oxide of zinc and aluminum represented by ZnAlO$_x$, where $0.9 \leq x \leq 1.1$.

2. The multi-layered low-emissivity coating of claim 1, wherein the composite metallic oxide layer of zinc and aluminum has a thickness of about 2 nm to about 10 nm.

3. The multi-layered low-emissivity coating of claim 1, wherein the low-emissivity layer has an emissivity of about 0.01 to about 0.3.

4. The multi-layered low-emissivity coating of claim 1, wherein the low-emissivity layer comprises at least one selected from the group consisting of Ag, Au, Cu, Al, Pt, ion-doped metal oxide, and combinations thereof.

5. The multi-layered low-emissivity coating of claim 4, wherein the ion-doped metal oxide include indium tin oxide, fluorine-doped tin oxide, Al-doped zinc oxide and gallium zinc oxide.

6. The multi-layered low-emissivity coating of claim 1, wherein the low-emissivity layer has a thickness of 5 nm to 25 nm.

7. The multi-layered low-emissivity coating of claim 1, wherein the low-emissivity protective metal layer has an extinction coefficient in a visible light region of about 1.5 to about 4.

8. The multi-layered low-emissivity coating of claim 1, wherein the low-emissivity protective metal layer comprises at least one selected from the group consisting of Ni, Cr, alloys of Ni and Cr, Ti, and combinations thereof.

9. The multi-layered low-emissivity coating of claim 1, further comprising an outermost dielectric layer having a Si-based composite metal nitride on at least one of the bottom surface or the top surface of the low-emissivity coating.

10. The multi-layered low-emissivity coating of claim 9, wherein the Si-based composite metal nitride is a composite represented by SiAlN$_x$, where $1.2 \leq x \leq 1.5$.

11. The multi-layered low-emissivity coating of claim 1, wherein the Si-based composite metal nitride comprises at least one selected from the group consisting of Al, Ti, Co, and combinations thereof.

12. The multi-layered low-emissivity coating of claim 1, wherein the Ti-based oxide layer comprises a composite represented by TiO$_x$, where $1.8 \leq x \leq 2.2$.

13. The multi-layered low-emissivity coating of claim 1, wherein the low-emissivity layer has a sheet resistance of 0.78 Ω/sq to 6.42 Ω/sq.

14. The multi-layered low-emissivity coating of claim 1, wherein the low-emissivity layer has an emissivity of about 0.01 to about 0.08.

15. A multi-layered low-emissivity coating having a bottom surface and a top surface opposite to the bottom surface, the multi-layered low-emissivity coating comprising, from the bottom surface to the top surface:
a first outermost dielectric layer;
a Ti-based oxide layer;
a composite metallic oxide layer of zinc and aluminum;
a first low-emissivity protective metal layer;
a low-emissivity layer;
a second low-emissivity protective metal layer; and
a second outermost dielectric layer;
wherein
the first outermost dielectric layer and the second outermost dielectric layer comprise a Si-based composite metal nitride, and the composite metallic oxide layer of zinc and aluminum comprises a composite metallic oxide of zinc and aluminum represented by $ZnAlO_x$, where $0.9 \leq x \leq 1.1$.

16. A functional construction material for at least one of a window or a door, comprising: a transparent substrate; and the low-emissivity coating according to claim 1 coated on the transparent substrate.

17. The functional construction material for at least one of a window or a door of claim 16, wherein the low-emissivity coating is laminated in such a way that the Ti-based oxide layer is arranged closer to the transparent substrate than the low-emissivity layer.

18. The functional construction material for at least one of a window or a door of claim 16, wherein the transparent substrate has a visible light transmittance in the range of about 90% to about 100%.

19. The functional construction material for at least one of a window or a door of claim 16, wherein the transparent substrate is a glass or transparent plastic substrate.

20. The functional construction material for at least one of a window or a door of claim 16, wherein the transparent substrate has a thickness of 2 mm to 12 mm.

* * * * *